(12) United States Patent
Horbach

(10) Patent No.: US 10,104,485 B2
(45) Date of Patent: Oct. 16, 2018

(54) HEADPHONE RESPONSE MEASUREMENT AND EQUALIZATION

(71) Applicant: HARMAN INTERNATIONAL INDUSTRIES, INC., Stamford, CT (US)

(72) Inventor: Ulrich Horbach, Canyon Country, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 6 days.

(21) Appl. No.: 15/351,109

(22) Filed: Nov. 14, 2016

(65) Prior Publication Data

US 2017/0064476 A1    Mar. 2, 2017

Related U.S. Application Data

(63) Continuation of application No. 14/319,936, filed on Jun. 30, 2014, now Pat. No. 9,554,226.

(60) Provisional application No. 61/840,654, filed on Jun. 28, 2013.

(51) Int. Cl.
  *H04R 29/00* (2006.01)
  *H04R 3/04* (2006.01)
  *H04R 5/033* (2006.01)
  *G06F 3/16* (2006.01)

(52) U.S. Cl.
  CPC ............. *H04R 29/001* (2013.01); *H04R 3/04* (2013.01); *H04R 29/00* (2013.01); *G06F 3/165* (2013.01); *H04R 5/033* (2013.01)

(58) Field of Classification Search
  CPC .......... H04R 3/04; H04R 5/033; H04R 29/00; H04R 29/001; H04R 29/003; H04S 1/00; H04S 7/301; G06F 3/165
  See application file for complete search history.

(56) References Cited

U.S. PATENT DOCUMENTS

| 3,599,488 A | 8/1971 | Mather |
| 4,291,781 A | 9/1981 | Niguchi |
| 4,741,035 A | 4/1988 | Genuit |
| 5,182,774 A | 1/1993 | Bourk |

(Continued)

FOREIGN PATENT DOCUMENTS

| CN | 2924986 Y | 7/2007 |
| CN | 102769816 A | 11/2012 |

(Continued)

*Primary Examiner* — Mark Fischer
(74) *Attorney, Agent, or Firm* — Brooks Kushman P.C.

(57) ABSTRACT

An apparatus for evaluating performance of a headphone assembly is provided with a base and a support having a proximal end extending from the base. The support includes a distal end that is adapted for supporting a headphone assembly, and the support includes a pair of opposing sides that are laterally spaced apart. The apparatus also includes a pair of plates and at least two microphones. Each plate is mounted to one of the opposing sides of the support, and includes a central portion with at least two apertures formed therein. The central portion is sized for receiving a headphone of the headphone assembly. Each microphone is disposed within one of the apertures and arranged such that an outer surface of the microphone is oriented substantially parallel to an outer surface of the plate and adapted for receiving sound emitted from the headphone.

16 Claims, 16 Drawing Sheets

(56) References Cited

U.S. PATENT DOCUMENTS

| | | | |
|---|---|---|---|
| 5,402,497 A | 3/1995 | Nishimoto et al. | |
| 5,481,615 A | 1/1996 | Eatwell | |
| 5,499,302 A | 3/1996 | Masaaki et al. | |
| 5,928,160 A | 7/1999 | Clark et al. | |
| 5,937,070 A | 8/1999 | Todter | |
| 5,987,145 A * | 11/1999 | Lawton | H03G 5/005 381/103 |
| 6,597,792 B1 | 7/2003 | Sapiejewski | |
| 7,103,188 B1 | 9/2006 | Jones | |
| 8,447,045 B1 | 5/2013 | Laroche | |
| 8,879,743 B1 | 11/2014 | Mitra | |
| 2005/0130697 A1 | 6/2005 | Dyer | |
| 2005/0249355 A1 | 11/2005 | Chen | |
| 2006/0093159 A1* | 5/2006 | Koh | H04R 3/04 381/98 |
| 2006/0147057 A1* | 7/2006 | Aggarwal | H04S 7/301 381/103 |
| 2006/0262938 A1* | 11/2006 | Gauger, Jr. | G10L 21/02 381/56 |
| 2007/0195963 A1* | 8/2007 | Ko | H04S 7/306 381/26 |
| 2007/0253577 A1 | 11/2007 | Yen | |
| 2008/0165981 A1 | 7/2008 | Wurtz | |
| 2009/0220107 A1 | 9/2009 | Every | |
| 2010/0195842 A1 | 8/2010 | Sibbald | |
| 2010/0296668 A1 | 11/2010 | Lee | |
| 2010/0305725 A1* | 12/2010 | Brannmark | H04S 7/301 700/94 |
| 2011/0158419 A1 | 6/2011 | Theverapperuma | |
| 2011/0206214 A1 | 8/2011 | Christoph et al. | |
| 2011/0293103 A1 | 12/2011 | Park et al. | |
| 2012/0087510 A1 | 4/2012 | Sampimon | |
| 2012/0278070 A1 | 11/2012 | Herve et al. | |
| 2013/0236023 A1 | 9/2013 | Horton | |
| 2013/0243200 A1 | 9/2013 | Horbach | |
| 2014/0126734 A1 | 5/2014 | Gauger et al. | |
| 2014/0146973 A1 | 5/2014 | Liu et al. | |
| 2014/0167991 A1 | 6/2014 | Oshita | |
| 2014/0341388 A1* | 11/2014 | Goldstein | H04R 1/1083 381/71.11 |

FOREIGN PATENT DOCUMENTS

| | | |
|---|---|---|
| JP | 06070391 A | 3/1994 |
| JP | 08079873 A | 3/1996 |
| JP | 2009033309 A | 2/2009 |
| JP | 201215833 A | 1/2012 |

* cited by examiner

HEADPHONE RESPONSE MEASUREMENT AND EQUALIZATION

CROSS-REFERENCE TO RELATED APPLICATIONS

This application is a continuation of U.S. application Ser. No. 14/319,936 filed Jun. 30, 2014, now U.S. Pat. No. 9,554,226, which, in turn, claims the benefit of U.S. provisional application Ser. No. 61/840,654 filed Jun. 28, 2013, the disclosures of which are hereby incorporated in their entirety by reference herein.

TECHNICAL FIELD

One or more embodiments relate to test apparatuses for measuring audio signals and systems for enhancing sound reproduction over headphones.

BACKGROUND

Advancements in the recording industry include reproducing sound from a multiple channel sound system, such as reproducing sound from a surround sound system. Typically, surround sound or two-channel stereo recordings are recorded and then processed to be reproduced over loudspeakers, which limits the quality of such recordings when reproduced over headphones. For example, stereo recordings are usually meant to be reproduced over loudspeakers, instead of being played back over headphones. This results in the stereo panorama appearing on line in between the ears or inside a listener's head, which can be an unnatural and fatiguing listening experience.

To resolve the issues of reproducing sound over headphones, designers have derived stereo and surround sound enhancement systems for headphones; however, for the most part these enhancement systems have introduced unwanted effects such as unwanted coloration, resonance, reverberation, and/or distortion of timbre or sound source angle and/or position.

Sound color or timbre is the quality of a musical note or sound or tone that distinguishes different types of sound production, such as voices, musical instruments, and sound systems (e.g., loudspeakers and headphones). The physical characteristics of sound that determine the perception of timbre include spectrum and envelope. Generally, timbre is what makes a particular musical sound different from another, even when they have the same pitch and loudness.

U.S. Patent Application Publication No. 2013/0236023 to Horbach, describes a system for headphone equalization using an "equal loudness method", which filters the unwanted effects from the audio signals provided by headphones. The system includes a stored set of predetermined tone burst reference signals and a stored set of predetermined tone burst test signals that form a range of frequencies used in a user specific audio test to develop a headphone correction filter. A predetermined tone burst reference signal and a predetermined tone burst test signal may intermittently and sequentially drive a transducer included in the headphone. A loudness of the predetermined tone burst reference signal may be fixed and a loudness of the predetermined tone burst test signal may be variable with a gain setting. The gain setting may be used to generate the headphone correction filter.

SUMMARY

In one embodiment a method to enhance reproduction of sound is provided. A target function indicative of a target frequency response for a headphone assembly is determined. A first audio signal is provided to at least one headphone transducer of the headphone assembly. Audio output generated by the least one headphone transducer in response to receiving the first audio signal is measured. A second audio signal is received. The second audio signal is filtered using an equalization filter indicative of a difference between the measured audio output and the target function. The filtered audio signal is provided to the at least one headphone transducer.

In another embodiment, a system is provided with a housing and at least one audio transducer and a processor supported by the housing. The processor is programmed to receive an audio signal; filter the audio signal using an equalization filter indicative of a difference between a target function and audio output measured using a test apparatus with simplified contours; and provide the filtered audio signal to the at least one audio transducer.

In yet another embodiment, a method to enhance reproduction of sound is provided. A headphone assembly including at least one headphone transducer is provided. An audio signal is received. The audio signal is filtered using an equalization filter indicative of a difference between a target function and audio output measured using a test apparatus with simplified contours.

In one embodiment, an apparatus for evaluating performance of a headphone assembly is provided with a base and a support having a proximal end extending from the base. The support includes a distal end that is adapted for supporting a headphone assembly, and the support includes a pair of opposing sides that are laterally spaced apart. The apparatus also includes a pair of plates and at least two microphones. Each plate is mounted to one of the opposing sides of the support, and includes a central portion with at least two apertures formed therein. The central portion is sized for receiving a headphone of the headphone assembly. Each microphone is disposed within one of the apertures and arranged such that an outer surface of the microphone is oriented substantially parallel to an outer surface of the plate and adapted for receiving sound emitted from the headphone.

In another embodiment, a system is provided with a headphone assembly that includes at least one audio transducer and a processor. The processor is configured to receive an audio input signal and to filter the audio input signal using an equalization filter that is based on a target function having an arcuate response. The processor is also configured to provide a filtered audio output signal to the at least one audio transducer.

In yet another embodiment, a method is provided for enhancing reproduction of sound. An audio signal is received. A filtered audio signal is generated based on the audio signal using an equalization filter corresponding to a target function having an arcuate response. The filtered audio signal is provided to a headphone transducer.

As such, the test apparatus provides advantages over existing test apparatuses by providing a simplified structure without any simulated pinna and human ear canal. Such simulated structure in existing test apparatuses affects the perceived sound of a headphone, and results in measurement data that is difficult to interpret and of limited value for accurate headphone equalization (EQ). Further, a headphone assembly includes a processor with equalization filters that are designed to filter audio input based on a target function that is derived from measurement data using the test apparatus. The target function has an arcuate response, as opposed to existing target functions that have flat responses.

Equalizing the audio signal based on a such a target function provides an improved perceived sound from the headphone assembly over existing target functions.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
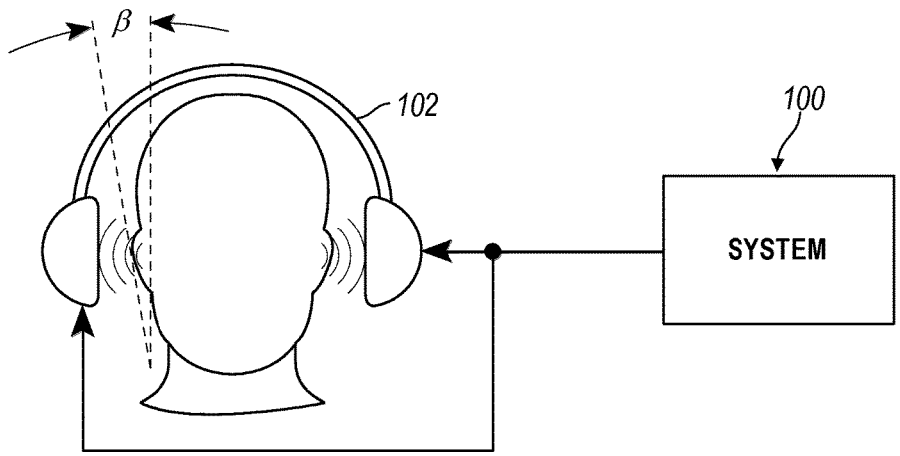
FIG. 1 is a schematic diagram illustrating a system for enhancing reproduction of sound, illustrated connected to a headphone assembly and generating sound waves to a user, according to one or more embodiments.

With reference to FIG. 1 a system for enhancing reproduction of sound is illustrated in accordance with one or more embodiments and generally referenced by numeral 100. The system 100 is connected (e.g., by a wired or wireless connection) to the headphone assembly 102. The headphone assembly 102 includes one or more transducers that are positioned in proximity to a user's ears. The headphone assembly 102 may be positioned on top of a user's ears (supra-aural), surrounding a user's ears (circum-aural) or within the ear (intra-aural). The system 100 provides audio signals to the headphone assembly 102, which are used to drive the transducers to provide audible sound to the user.

The system 100 may be implemented as or incorporated into various devices, such as a personal computer (PC), a tablet PC, a personal digital assistant (PDA), a mobile device, a palmtop computer, a laptop computer, a desktop computer, a communications device, a wireless telephone, an audio device, or any other machine capable of executing a set of instructions (sequential or otherwise) that specify actions to be taken by that machine. Examples of audio devices include an amplifier, a compact disc player, a television, a vehicle head unit, a radio, a home theater system, an audio receiver, an MP3 player, an audio headphone, a phone, or any other device capable of generating audio signals and/or audible sound perceived by a listener. In a particular example, the system 100 may be implemented using a wireless electronic device, such as a smartphone, that provides voice, audio, video or data communication. Further, while a single system 100 is illustrated, the term "system" shall also be taken to include any collection of systems or sub-systems that individually or jointly execute a set, or multiple sets, of instructions to perform one or more computer functions.

The system 100 includes a plurality of modules. The term "module" may be defined to include a plurality of executable modules. As described herein, the modules are defined to include software, hardware or some combination of hardware and software that is executable by a processor, such as a digital signal processor (DSP). Software modules may include instructions stored in memory that are executable by the processor or another processor. Hardware modules may include various devices, components, circuits, gates, circuit boards, and the like that are executable, directed, and/or controlled for performance by the processor.

Figure 2:
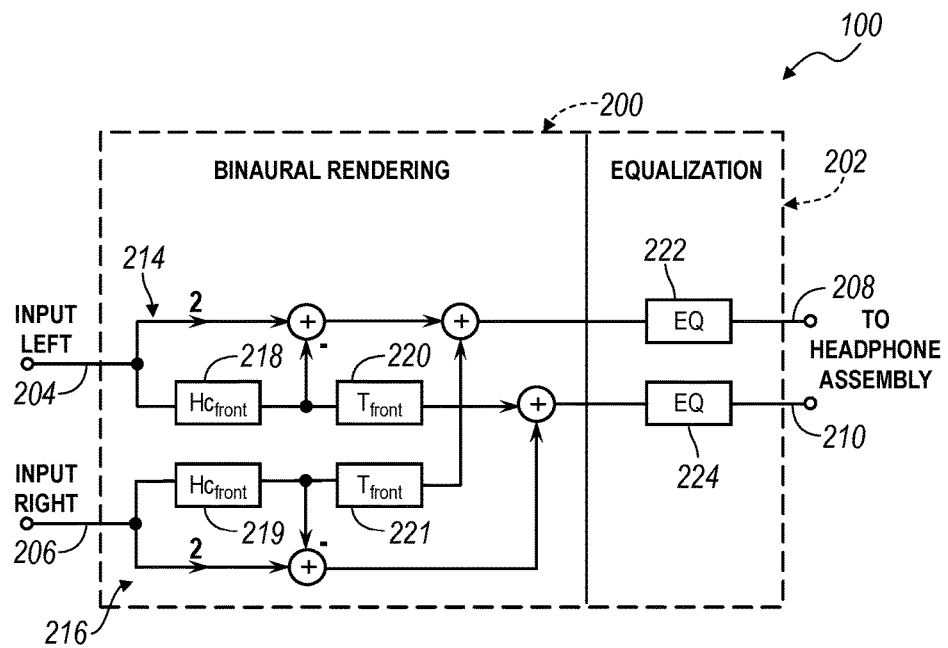
FIG. 2 is a control diagram of a portion of the system of FIG. 1.

Referring to FIG. 2, the system 100 includes a binaural rendering module 200 and an equalization module 202 that enhance the naturalness of music reproduction over headphones, according to one or more embodiments. The binaural rendering module 200 includes a left input 204 and a right input 206 that are connected to an audio source (not shown) for receiving audio signals. The binaural rendering module 200 and the equalization module 202 filter the audio signals, as described in detail below. The equalization module 202 includes a left output 208 and a right output 210 for providing audio signals to drive the transducers of the headphone assembly 102 (shown in FIG. 1) to provide audible sound to the user. The modules 200, 202 may be combined with other audio signal processing modules to further filter the audio signals before providing them to the headphone assembly 102.

The binaural rendering module 200 includes a left-channel head-related filter (HRTF) 214, and a right-channel HRTF 216, according to one or more embodiments. Each HRTF 214, 216 includes an inter-aural cross function (Hc-$_{front}$) 218, 219 and an inter-aural time delay (T$_{front}$) 220, 221, respectively, corresponding to frontal sound sources, thereby emulating a pair of loudspeakers in front of the listener (e.g., at +/−30° or +/−45° relative to the listener). In other embodiments, the binaural rendering module 200 also includes HRTFs that correspond to side and rear sound sources. The design of the binaural rendering module is described in detail in U.S. application Ser. No. 13/419,806 to Horbach, which is incorporated by reference in its entirety herein.

The equalization module 202 includes equalization filters for improving the perceived spectral balance that is specific to headphone type and construction. The equalization module 202 includes a first equalization filter 222 that is connected to the output of the left-channel HRTF 214 and a second equalization filter 224 that is connected to the output of the right-channel HRTF 216. Generally, the equalization filters 222, 224, serve two purposes: to increase smoothness of the headphone's frequency response by eliminating local deviations from a smooth curve, caused by resonances from cavities or membrane breakup; and to form the global shape of the response to improve spectral balance, with the goal to approximate loudspeaker listening in a typical room. The equalization filters 222, 224 include parameters that are configured using measurement data obtained for the particular headphone using one of the test apparatuses described below with reference to FIGS. 4-6. In one or more embodiments, the parameters of the equalization filters 222, 224 may be further adjusted by the user using the equal loudness method, as described in U.S. application Ser. No. 13/415, 536 to Horbach, which is incorporated by reference in its entirety herein. The equalization filters 222, 224 are implemented as linear equalization filters, such as finite impulse response (FIR) filters, or minimum-phase FIR filters, according to one or more embodiments. In other embodiments, the equalization filters 222, 224 are implemented as cascaded biquadratic equalization filters, such as infinite impulse response (IIR) filters. In another embodiment, the equalization filters 222, 224 are implemented as a low frequency shelving filter and a high frequency cut filter.

Figure 3:
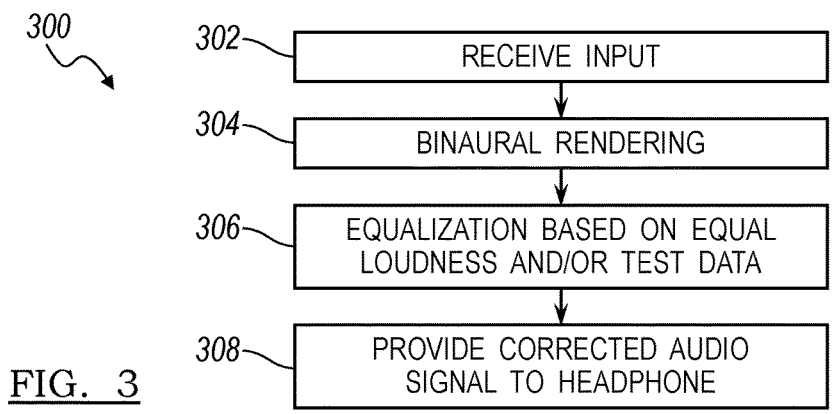
FIG. 3 is a flow chart illustrating a method for enhancing reproduction of sound, according to one or more embodiments.

Referring to FIG. 3 the system 100 includes one or more algorithms or methods for enhancing sound reproduction. These methods may be implemented individually (e.g., as a module) or in combination with one or more other methods (e.g., as a plurality of modules). The system 100 includes any number of microprocessors, ASICs, ICs, memory (e.g., FLASH, ROM, RAM, EPROM and/or EEPROM) which co-act with software code to perform the operations of the method(s).

With reference to FIGS. 2 and 3, at operation 302, the system 100 receives input signals indicative of a left audio signal at left input 204 and a right audio signal at right input 206.

At operation 304, the system 100 filters the input signals using the binaural rendering module 200.

At operation 306, the system 100 equalizes the filtered signals which are indicative of the headphone's frequency response using measurement data obtained for the particular headphone using one of the test apparatuses described below with reference to FIGS. 4-6. The system 100 then further equalizes the headphone's frequency response according to the equal loudness method, according to one or more embodiments.

At operation 308, the system 100 provides the equalized filtered signals to the transducers of the headphone assembly 102 to provide audible sound to the user.

Existing test apparatus for measuring audio signals generated by headphones often include standard ear simulators in accordance with IEC 60711 (for example GRAS 43AG). These contain simulated pinna and human ear canal, such that the resulting response is claimed to resemble the sound pressure at the ear drum of an "average" person. However, the contour of the ear (i.e., the pinna and the ear canal) varies between each user and also significantly affects the perceived sound of a headphone. Therefore, measurement data (binaural data) measured by such test apparatuses are difficult to interpret and of limited value for accurate headphone equalization (EQ) because measured headphone data does not take individually perceived frequency responses and variations among listeners into account.

Figure 4:
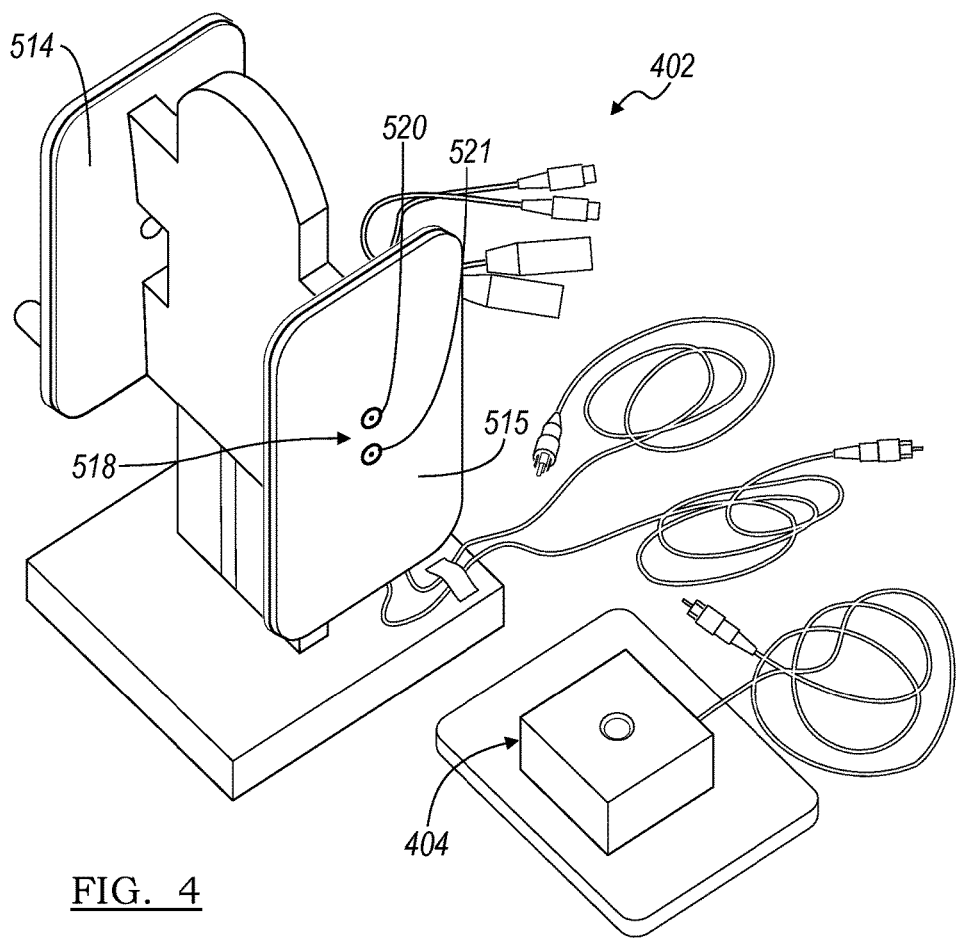
FIG. 4 is top perspective view of a first test apparatus for measuring sound generated by an on-ear headphone assembly, and a second test apparatus for measuring sound generated by an in-ear headphone assembly, according to one or more embodiments.
Figure 5:
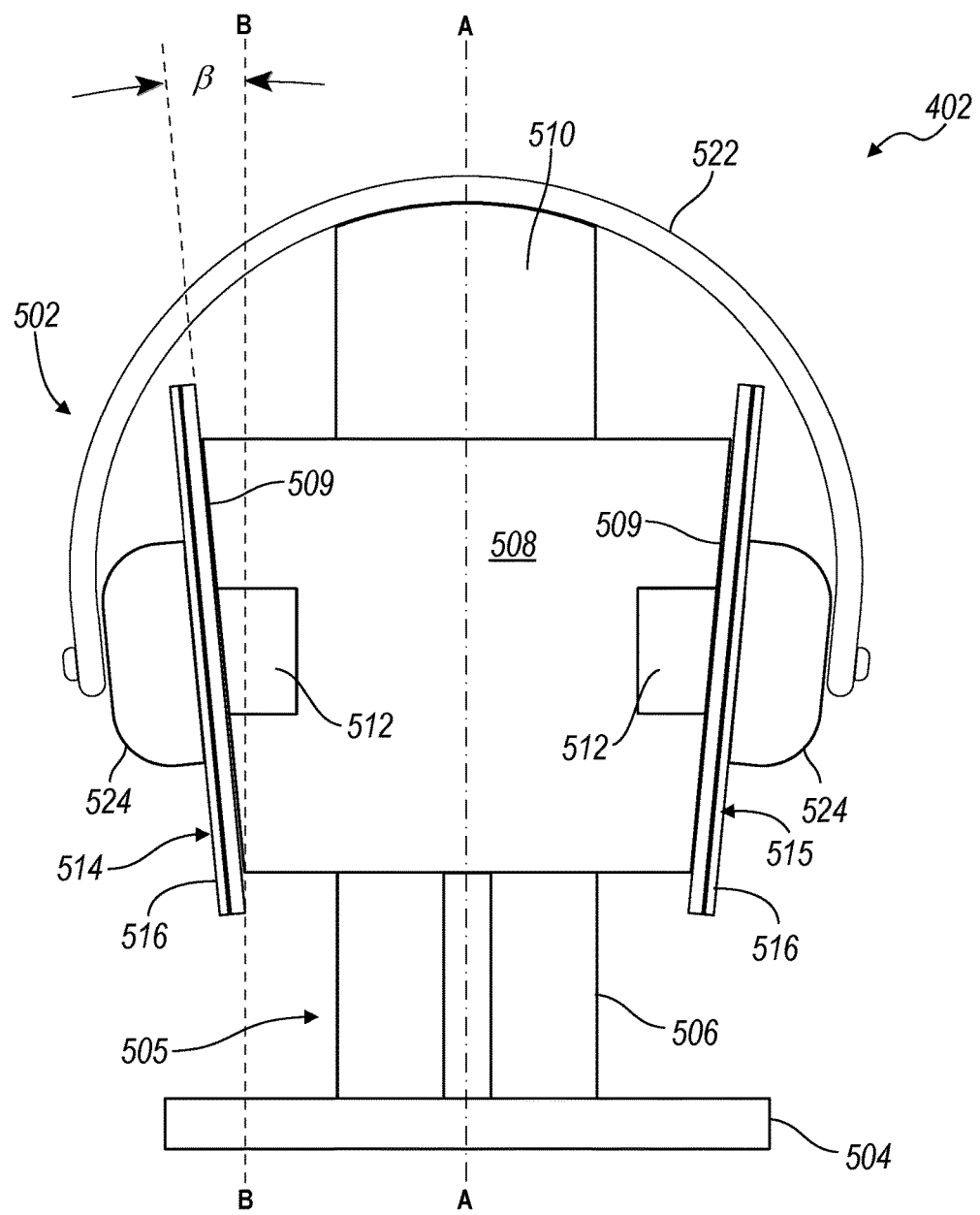
FIG. 5 is a front view of the first test apparatus of FIG. 4, illustrated with an on-ear headphone assembly.
Figure 6:
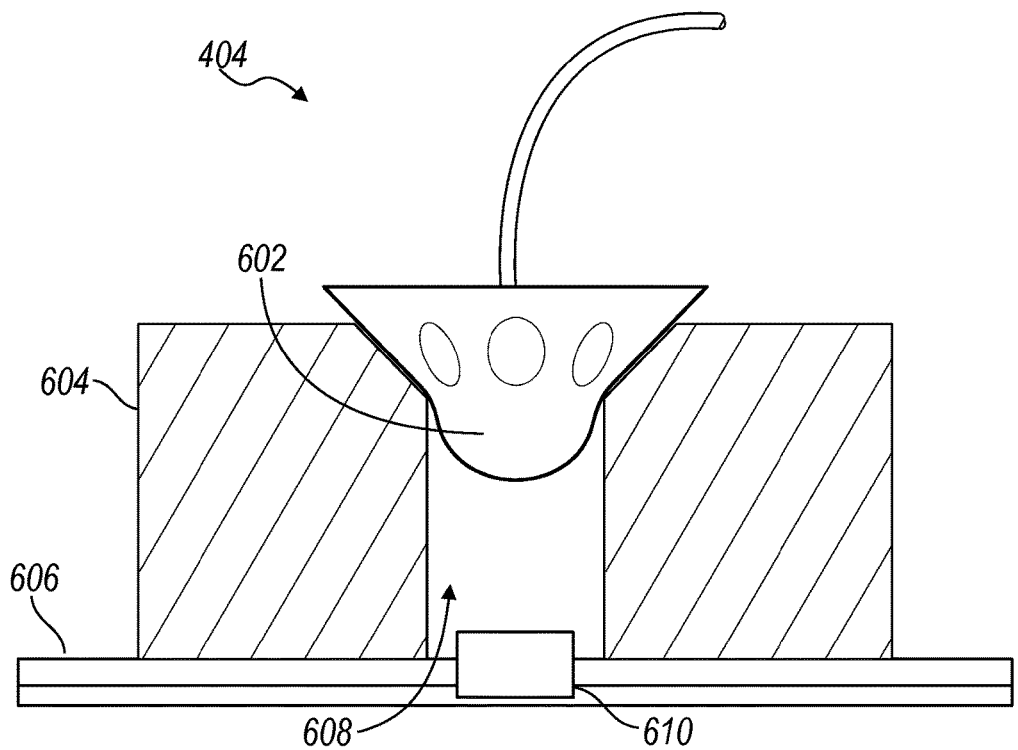
FIG. 6 is a section view of the second test apparatus of FIG. 4, illustrated with an in-ear headphone assembly.

Referring to FIGS. 4-6, a first test apparatus and a second test apparatus are illustrated in accordance with one or more embodiments and referenced by numerals 402 and 404, respectively. The test apparatuses 402, 404 are generally sized with overall dimensions that correspond to the human anatomy, however the test apparatuses 402, 404 are formed with simplified contours. With reference to FIGS. 4 and 5, the first test apparatus 402 is adapted to measure sound that is generated by a supra-aural (i.e., on-ear) headphone assembly, or by a circum-aural (i.e., around the ear) headphone assembly, such as headphone assembly 502. The first test apparatus 402 includes a base 504 and a support 505 having a proximal end 506 that extends transversely from the base 504 along a longitudinal axis "A-A". The support 505 also includes an intermediate portion 508 and a distal end 510. The dimensions of the intermediate portion 508 and the distal end 510 correspond to the overall dimensions of an average human head. The intermediate portion 508 includes opposing lateral sides 509 that are each formed at an angle ($\beta$) relative to vertical axis "B-B". An opening 512 is formed into each lateral side of the intermediate portion 508. Angle $\beta$ is equal to approximately five to ten degrees, which corresponds to the shape of an average human head, as shown in FIG. 1.

A left plate 514 and a right plate 515 are each mounted to an opposing lateral side of the intermediate portion 508. The plates 514, 515 may be formed of a metal, such as Aluminum, and may be covered with a coating 516 that is formed of an elastomeric material (e.g., memory foam). The coating 516 absorbs high frequency sound waves, similar to human skin.

A microphone array 518 (shown in FIG. 4) including two or more microphones, is mounted to a central portion of each plate 514, 515, such that the microphones are disposed laterally adjacent to a corresponding opening 512. In one or more embodiments, each microphone array 518 includes two microphones, including a first microphone 520 and a second microphone 521 that are spaced apart from each other at a distance between 20-30 mm. The microphones 520 and 521 are mounted flush to an external surface of each plate 514, 515, such that an outer surface of each microphone 520, 521 is substantially parallel to an outer surface of the corresponding plate 514, 515. The electrical wiring (not shown) of the microphones 520, 521 extends through the plate and routes through the corresponding opening 512. The microphones 520, 521 are calibrated with respect to a reference (e.g., a Bruel & Kjaer type 4190), and a correction filter is applied to the measured data, to compensate for deviations from a flat response, usually above 10 kHz only. The illustrated embodiment depicts an on-ear headphone 502 that includes a band 522 and a pair of earpads 524 that are each disposed around a transducer (not shown). The first test apparatus 502 is configured such that the band 522 rests upon the distal end 510, and each earpad 524 encloses the microphones 520, 521 of a corresponding microphone array 518.

With reference to FIGS. 4 and 6, the second test apparatus 404 is adapted for measuring sound that is generated by an in-ear headphone assembly, such as headphone assembly 602. The second test apparatus 404 includes a coupler 604 and a plate 606. The coupler 604 is formed in a cylindrical shape, according to one embodiment, and includes an aperture 608 that projects through a longitudinal height of the coupler 604. The size of the coupler 604 corresponds to that of an ear cavity in order to accurately determine the perceived frequency response of the headphone assembly 602. The second test apparatus 404 also includes one or more microphones 610 that are mounted to the plate 606 and oriented at a first longitudinal end of the aperture 608. The headphone assembly 602 is oriented at a second longitudinal end of the aperture 608, and opposite of the microphone(s).

Figure 7:
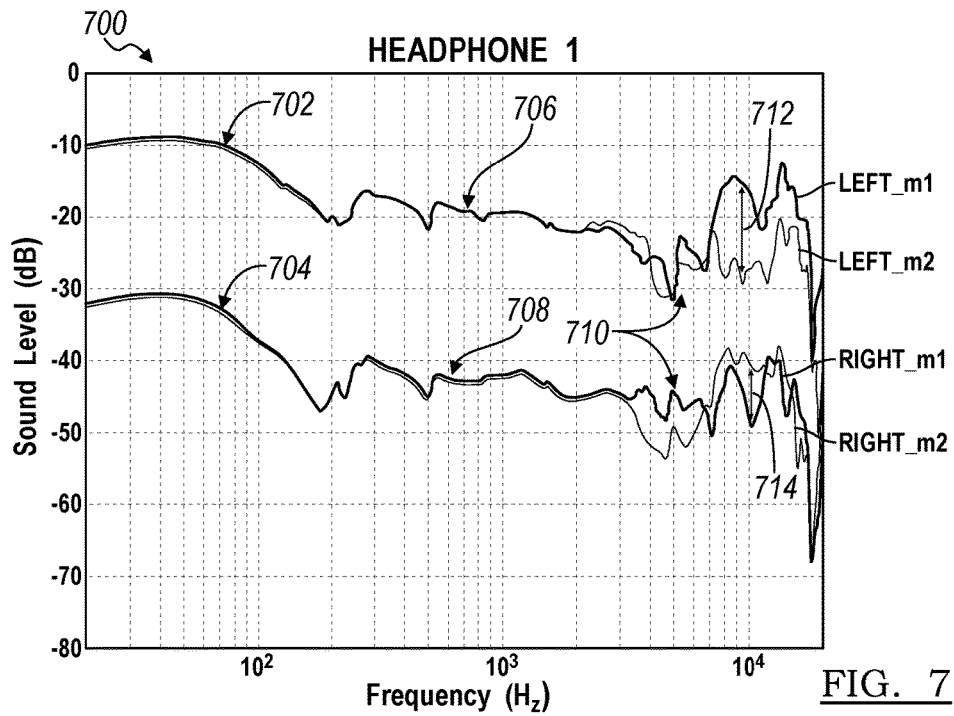
FIG. 7 is a graph illustrating a frequency response of sound measurement data generated by a first headphone assembly and measured by the first test apparatus.

FIGS. 7-10 are graphs illustrating the frequency response of headphone assemblies that were measured by the first test apparatus 402. FIG. 7 is a graph 700 that illustrates sound data generated by a first headphone assembly ("Headphone 1"). The first headphone assembly is a large, on-ear (circum-aural) closed-back headphone, according to one embodiment. A first curve, labeled "LEFT_m1", illustrates data recorded by the first microphone 520 of the left plate 514 (shown in FIGS. 4 and 5). A second curve, labeled "LEFT_m2", illustrates data recorded by the second microphone 521 of the left plate 514. A third curve, labeled "RIGHT_m1", illustrates data recorded by the first microphone 520 of the right plate 515. A fourth curve, labeled "RIGHT_m2", illustrates data recorded by the second microphone 521 of the right plate 515.

The sound level of the data generated by the first headphone assembly, is relatively high at low frequencies, which may be referred to as a "bass boost", and is referenced by numerals 702 and 704. The data is substantially constant or "flat" within an intermediate frequency interval between 200 Hz to 3 kHz, as illustrated by the slope of the curves and generally referenced by numerals 706 and 708. At high frequencies, the sound level of the data becomes "rougher" as illustrated by the oscillation of the curves and by the separation between the curves (Left compared to Right) spatially, which is generally referenced by numeral 710. Additionally, the curves deviate between the first and second microphones of a common array, as generally referenced by numerals 712 and 714.

Figure 8:
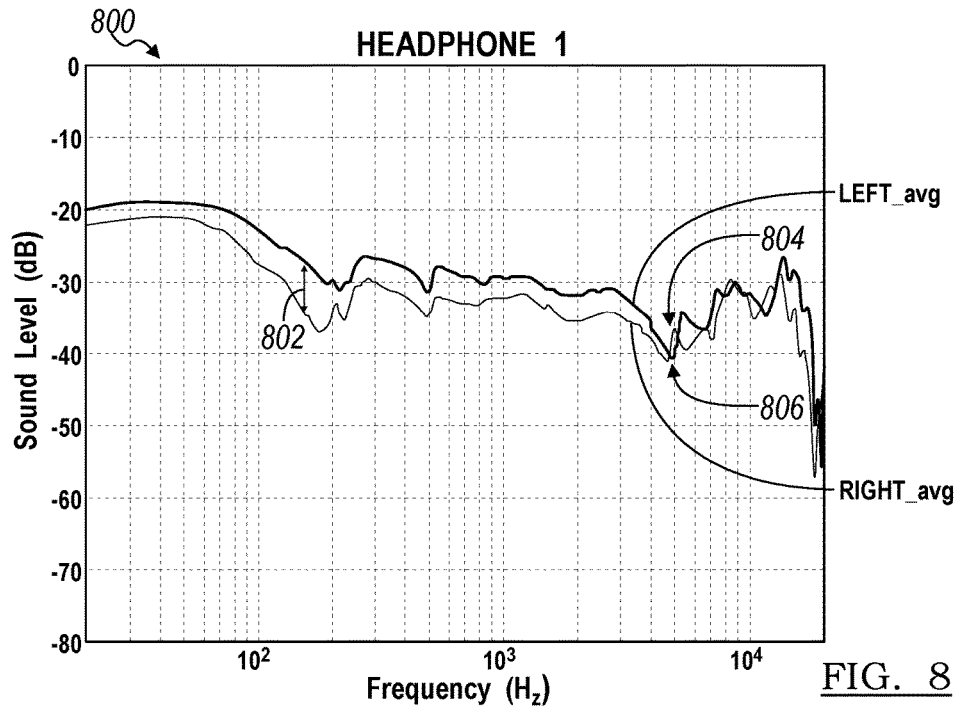
FIG. 8 is a graph of a spatial average of the sound measurement data of FIG. 7.

FIG. 8 is a graph 800 of the spatial-averages of the data shown in FIG. 7. The spatial-average refers to the average of the data recorded by all of the microphones of a microphone array. A first curve, labeled "LEFT_avg", illustrates a spatial-average of the data recorded by the first and second microphones 520, 521 of the left plate 514. A second curve, labeled "RIGHT_avg", illustrates a spatial-average of the data recorded by the first and second microphones 520, 521 of the right plate 515. There is a significant difference between the sound level generated by the different headphones (right and left), which is generally referenced by numeral 802. The curves illustrate a decrease in sound level at approximately 5 kHz, which is generally referenced by numerals 804 and 806, which may be filtered or "boosted" using a peak filter to obtain a generally flat response throughout the intermediate frequency range.

Figure 9:
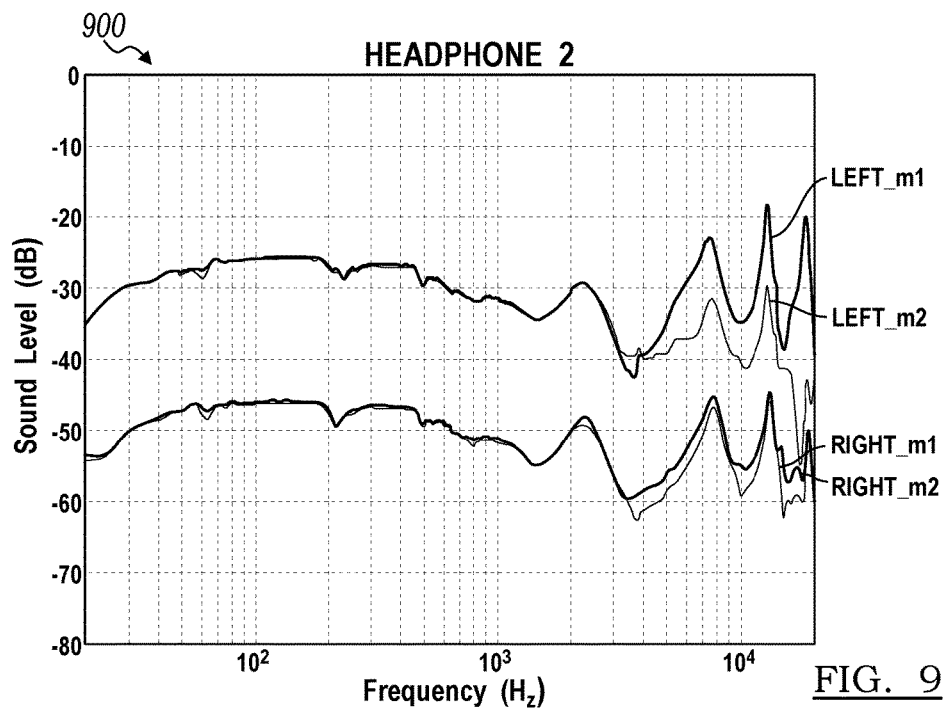
FIG. 9 is a graph illustrating a frequency response of sound measurement data generated by a second headphone assembly and measured by the first test apparatus.
Figure 10:
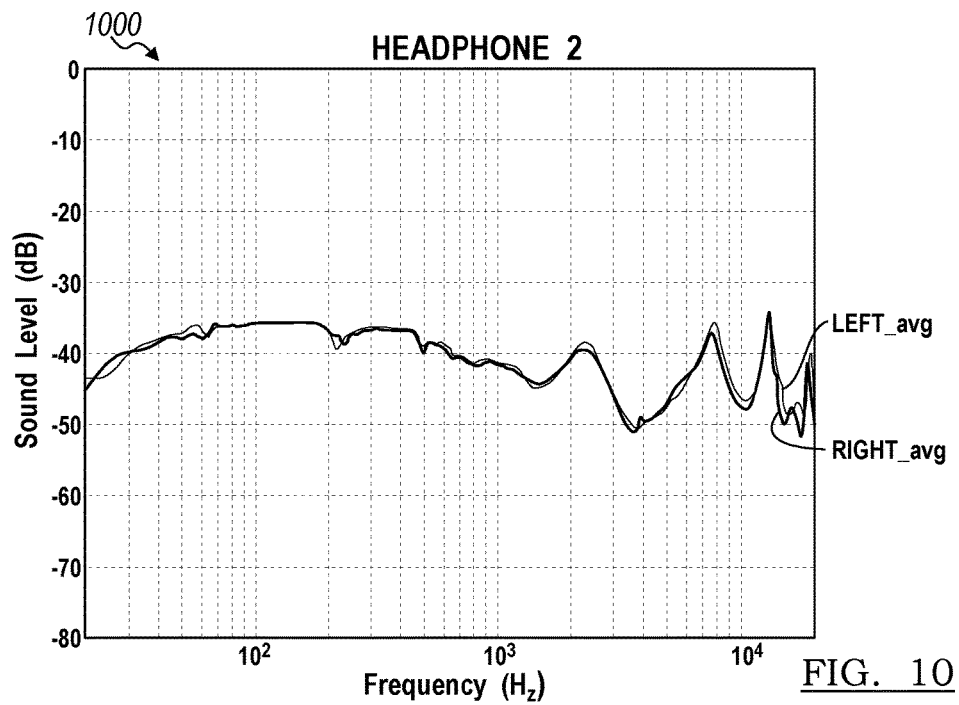
FIG. 10 is a graph of a spatial average of the sound measurement data of FIG. 9.

FIGS. 9 and 10 are graphs illustrating sound data generated by a second headphone assembly ("Headphone 2") and measured by the first test apparatus 402. The second headphone assembly is an on-ear (circum-aural) open-back headphone, according to one embodiment. FIG. 9 is a graph 900 that includes a first curve, labeled "LEFT_m1", and a second curve, labeled "LEFT_m2", that illustrate data recorded by the first microphone 520 and the second microphone 521 of the left plate 514, respectively. Graph 900 also includes a third curve, labeled "RIGHT_m1", and a fourth curve, labeled "RIGHT_m2", that illustrate data recorded by the first microphone 520 and the second microphone 521 of the right plate 515, respectively. With reference to FIG. 10, graph 1000 illustrates the spatial-average of the data of FIG. 9. A first curve, labeled "LEFT_avg", illustrates the spatial-average of the data recorded by the first and second microphones 520, 521 of the left plate 514. A second curve, labeled "RIGHT_avg", illustrates the spatial-average of the data recorded by the first and second microphones 520, 521 of the right plate 514. The frequency responses of the curves illustrated in FIGS. 9 and 10 are more consistent, as compared to the curves of FIGS. 7 and 8. However, higher order filters are used to obtain an overall flat response throughout the intermediate frequency range.

The system 100 (shown in FIGS. 1 and 2) provides a headphone listening experience that closely resembles the listening experience provided by loudspeakers in a room. To provide such a listening experience, the system 100 corrects the tonal balance of the sound generated by the individual headphone.

Figure 11:
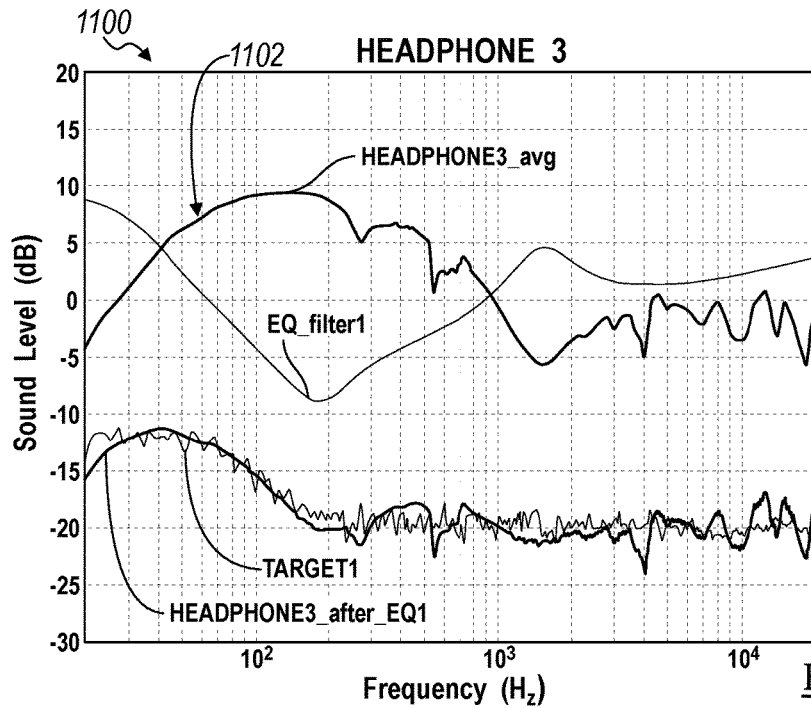
FIG. 11 is a graph illustrating a frequency response of sound measurement data generated by a third headphone assembly and measured by the first test apparatus, and also illustrating equalized filtered data associated with the measurement data and a first room target function.
Figure 12:
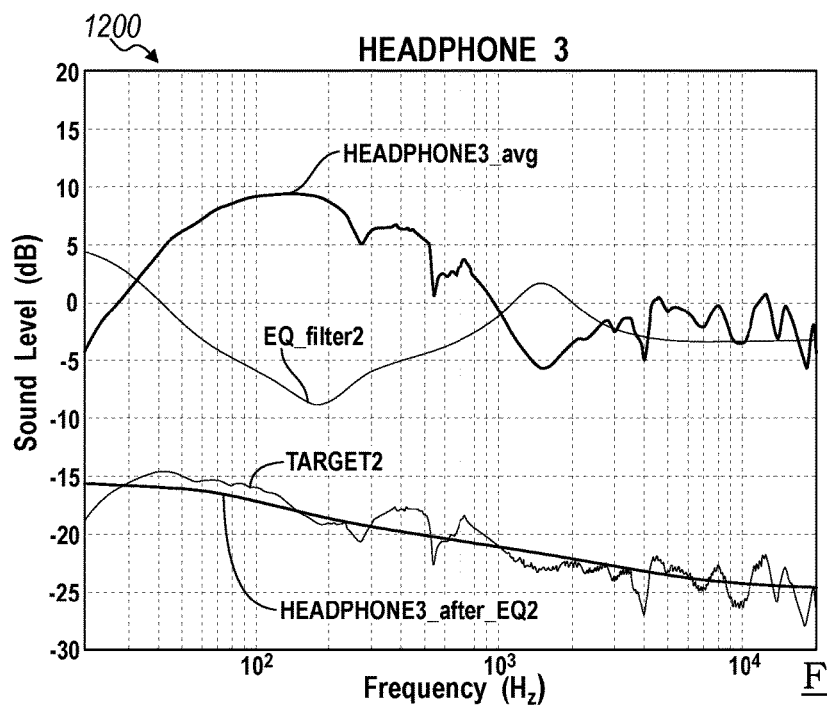
FIG. 12 is a graph illustrating a frequency response of sound measurement data generated by the third headphone assembly and measured by the first test apparatus, and also illustrating equalized filtered data associated with the measurement data and a second room target function.

FIGS. 11 and 12 are graphs illustrating the frequency response of sound measurement data generated by a third headphone assembly ("Headphone 3") and equalized filtered data associated with the measurement data. The equalized filtered data is generated by the system 100 shown in FIGS. 1 and 2, where the binaural rendering module 200 is not activated, and the equalization module 202 is activated, according to one or more embodiments. Additionally, graphs 1100 and 1200 also include "target" frequency response data as typically observed at a listening seat in listening rooms with loudspeakers.

FIG. 11 is a graph 1100 that includes a first curve labeled, "HEADPHONE3_avg", that illustrates the average of the sound data generated by the third headphone assembly and measured by the first test apparatus 402. The third headphone assembly is an on-ear (circum-aural) headphone, according to one embodiment. A second curve, labeled "TARGET1", illustrates one preferred target response for the equalization. A third curve, "EQ_filter1", illustrates the frequency response of a first equalization filter that is associated with TARGET1. The equalization filter is an infinite impulse response (IIR) filter (not shown) including cascaded, bi-quadratic peak/notch filters, according to one or more embodiments. A fourth curve, labeled "HEADPHONE3_after_EQ1", illustrates the HEADPHONE3 data equalized by the EQ_filter1.

The third headphone assembly exhibits a bass boost at low frequencies (e.g., between 0-200 Hz), as illustrated by the HEADPHONE3_avg curve and referenced by numeral 1102. The bass boost results in an unpleasant, boomy sound before the sound data is equalized. Also, referring back to FIGS. 7-11, the bass boost of the third headphone assembly (1102, shown in FIG. 11) is significantly larger than the bass boost of the first headphone assembly (702 and 704, shown in FIG. 7) and of the second headphone assembly (shown in FIGS. 9 and 10).

FIG. 12 is a graph 1200 that includes the HEADPHONE3_avg curve from FIG. 11. A second curve, labeled "TARGET2", illustrates another preferred target response for the equalization. A third curve, labeled "EQ_filter2", illustrates the frequency response of an equalization filter (not shown) that is associated with TARGET2. The equalization filter is an IIR filter including cascaded, bi-quadratic peak/notch filters, according to one or more embodiments. A fourth curve, labeled "HEADPHONE3_after_EQ2", illustrates the HEADPHONE3 data equalized by EQ_filter2.

Figure 13:
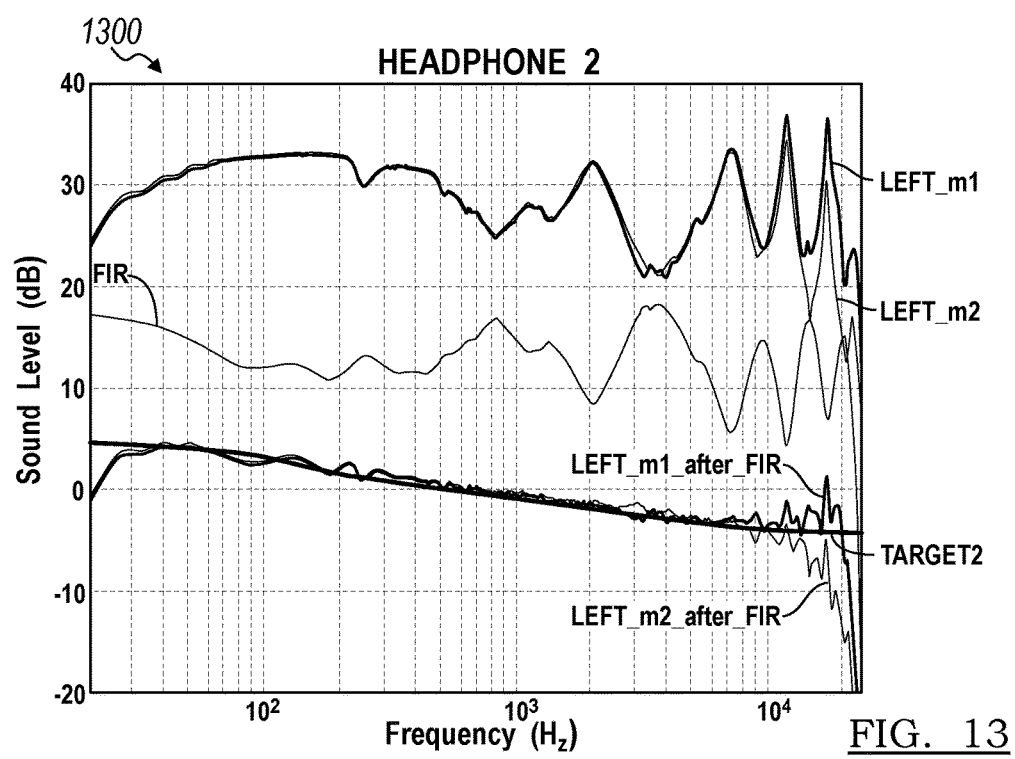
FIG. 13 is a graph illustrating a frequency response of sound measurement data generated by the second headphone assembly and measured by the first test apparatus, and also illustrating data that is filtered using a finite impulse response (FIR) filter that is associated with the measurement data and the second room target function.
Figure 14:
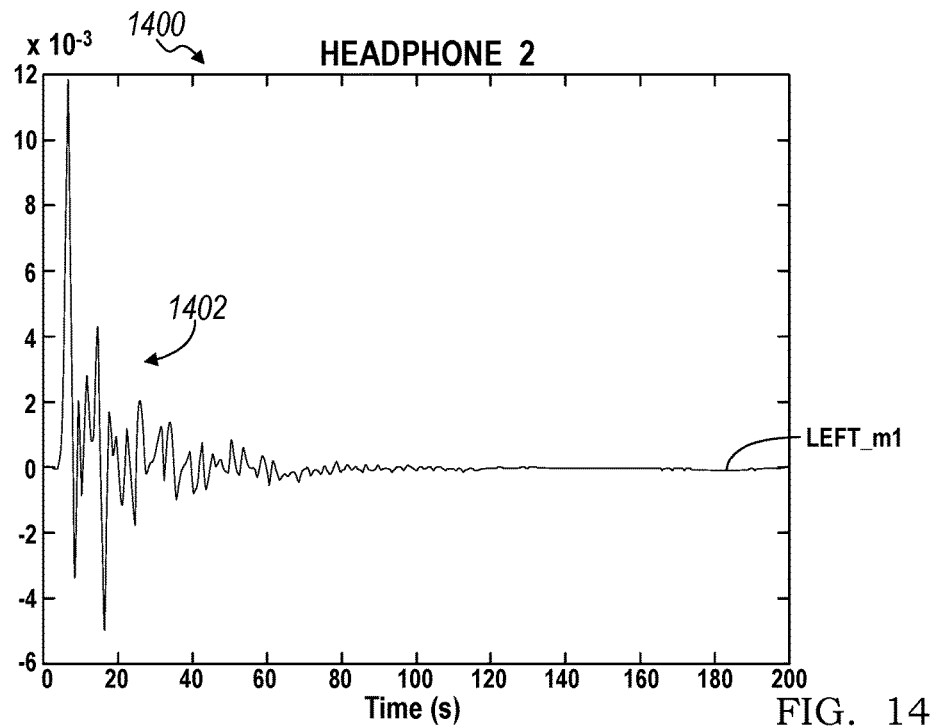
FIG. 14 is a graph illustrating the sound measurement data of FIG. 13 in the time domain.
Figure 15:
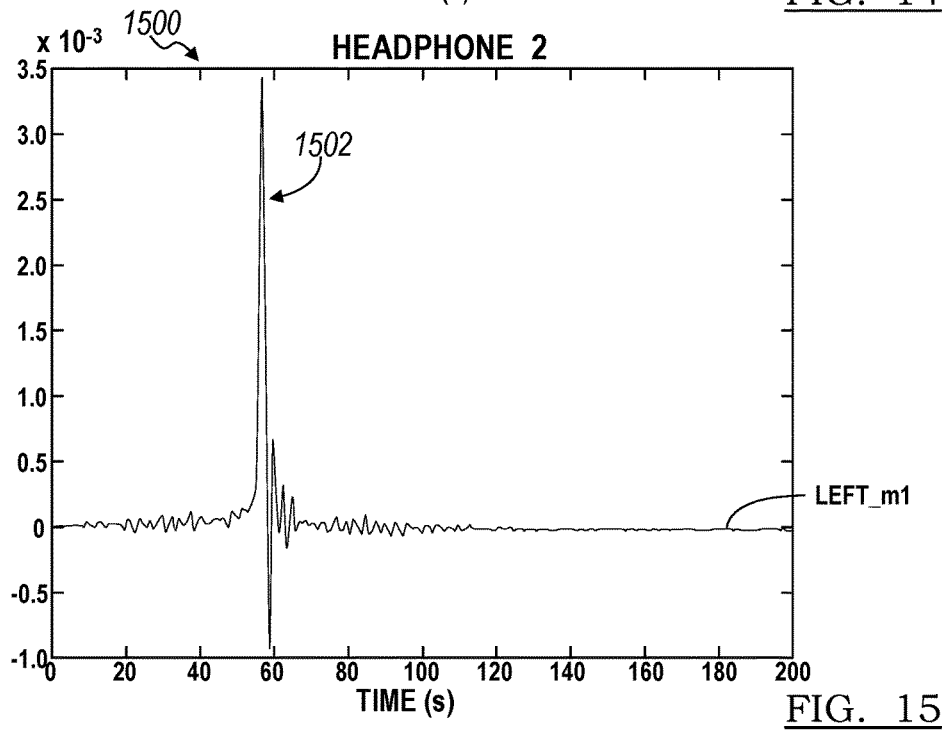
FIG. 15 is a graph illustrating the filtered sound measurement data of FIG. 13 in the time domain.

FIGS. 13-15 are graphs illustrating the frequency response and the impulse response of sound measurement data generated by the second headphone assembly and filtered using a finite impulse response (FIR) filter that is associated with the measurement data. Generally, FIR filters provide more accurate compensation, as compared to IIR (cascaded biquadratic) equalization filters. However, FIR filters are only applicable when the headphone measurement data exhibits little spatial variance of frequency response shapes. An example of such sound measurement data that exhibits little spatial variance was generated by headphone 2 and illustrated in FIG. 9.

FIG. 13 is a graph 1300 that includes the LEFT_m1, and LEFT_m2 curves obtained from the second headphone assembly. A third curve, labeled "FIR", illustrates the frequency response of a FIR filter having an n value of 512, where the n value corresponds to the length of the filter. A fourth curve, labeled "LEFT_m1_after_FIR", illustrates the LEFT_m1 data filtered by FIR, and a fifth curve, labeled "LEFT_m2_after_FIR", illustrates the LEFT_m2 data filtered by FIR. A sixth curve illustrates TARGET2 from FIG. 12.

With reference to FIGS. 14 and 15, the FIR filter, which is a linear-phase equalization filter, also reduces time dispersion. FIG. 14 is a graph 1400 that includes a curve, labeled "LEFT_m1_time", which illustrates the unfiltered impulse response data of FIG. 13 (LEFT_m1) in the time domain. The post-ringing feature present on the impulse response measurement data, and illustrated by the LEFT_m1_time curve, are generally referenced by numeral 1402.

FIG. 15 is a graph 1500 that includes a curve, labeled "LEFT_m1_time_after_FIR", which illustrates the filtered sound data of FIG. 13 (LEFT_m1_after_FIR) in the time domain. The post-ringing present on the filtered sound data (LEFT_m1_after_FIR), are generally referenced by numeral 1502, and are much shorter than the post-ringing feature 1402 present on the unfiltered curve in FIG. 14. A comparison of the data shown in FIGS. 14 and 15 to that shown in FIGS. 11 and 12 illustrates that low-order IIR filters do not improve time dispersion equally well. Very high order IIR would reduce time dispersion, like minimum-phase FIR filters.

Figure 16:
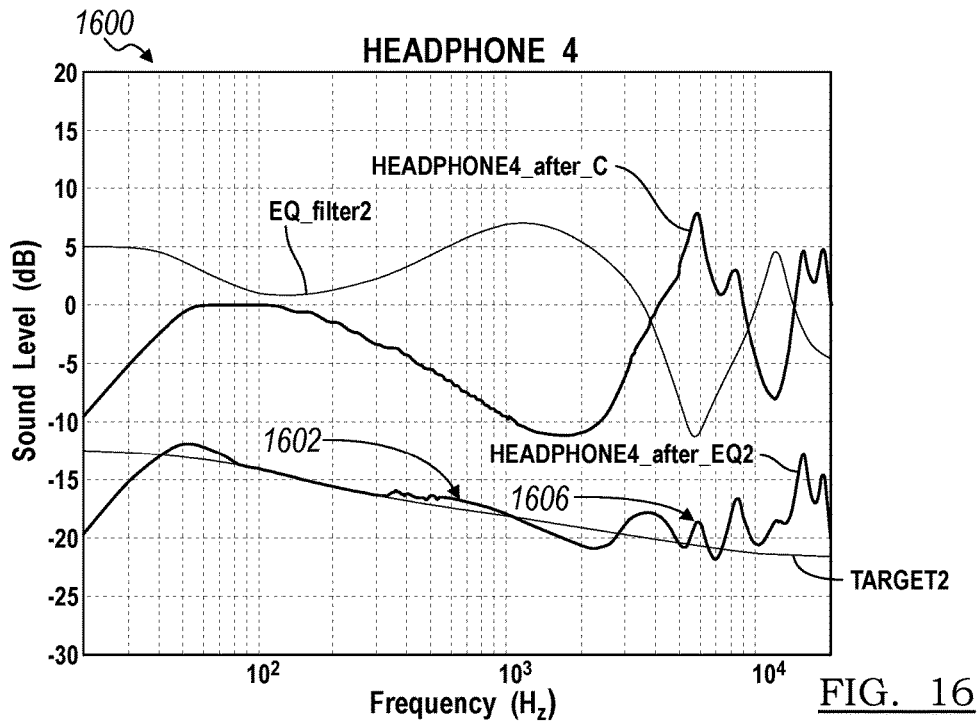
FIG. 16 is a graph illustrating a frequency response of sound measurement data generated by a fourth headphone assembly and measured by the second test apparatus, and also illustrating equalized filtered data associated with the measurement data and the second room target function.
Figure 17:
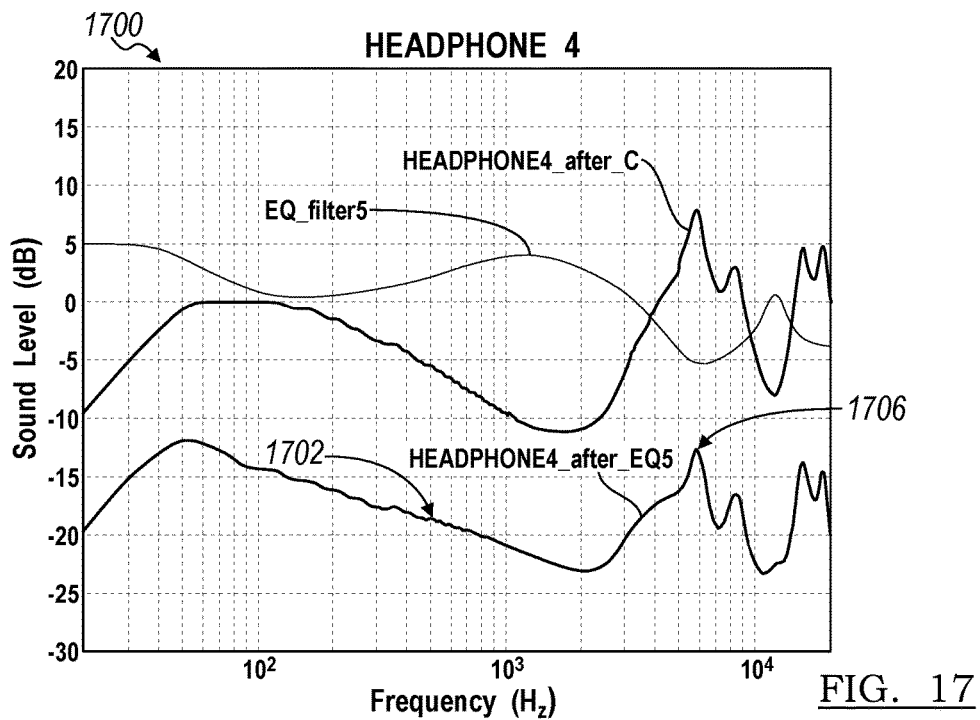
FIG. 17 is a graph illustrating a frequency response of sound measurement data generated by the fourth headphone assembly and measured by the second test apparatus, and also illustrating equalized filtered data associated with the measurement data and a subjective target function.
Figure 18:
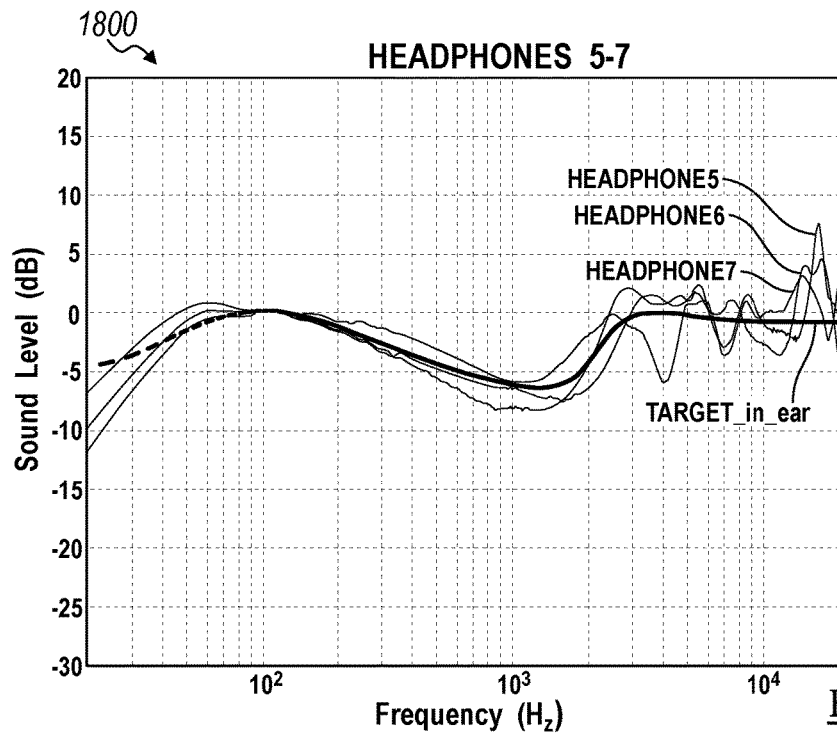
FIG. 18 is a graph illustrating a frequency response of sound measurement data generated by three headphone assemblies and a common subjective target function.

FIGS. 16-18 illustrate data associated with in-ear headphone assemblies. As described in detail below, the correction of in-ear headphones is not as straight-forward as large headphones, because it requires a modified, subjective target function.

FIGS. 16 and 17 illustrate the frequency response of sound measurement data generated by a fourth headphone assembly and measured by the second test apparatus 404 (shown in FIGS. 4 and 6). FIG. 16 is a graph 1600 that illustrates sound data generated by the fourth headphone assembly and compared to a preferred room target function. The fourth headphone assembly is an in-ear headphone, according to one embodiment. A first curve, labeled "HEADPHONE4_after_C" illustrates data recorded by a microphone 610 that is mounted within the cavity 608 of the coupler 604 (shown in FIGS. 4 and 6), and after applying a correction filter, such as the filter described below with reference to FIGS. 25-28. The curve deviates significantly from a flat response. A second curve, labeled "TARGET2" illustrates a preferred room target function. A third curve, labeled "EQ_filter2", illustrates the frequency response of an equalization filter that is associated with TARGET2 and includes a cascade of biquadratic filters. A fourth curve, labeled "HEADPHONE4_after_EQ2" illustrates the HEADPHONE4_after_C data equalized by EQ_filter2.

FIG. 17 is a graph 1700 that illustrates sound data generated by Headphone 4, and compared to a subjective target function. The graph 1700 includes curve HEADPHONE4_after_C from FIG. 16. A second curve, labeled "EQ_filter5" illustrates the frequency response of a modified equalization filter that has been derived by modifying the EQ_filter2 subjectively. A third curve, labeled "HEADPHONE4_after_EQ5" illustrates the HEADPHONE4_after_C data equalized by the EQ_filter5. The frequency response in the intermediate frequency range is generally referenced by numeral 1702, and is comparable to the frequency response of HEADPHONE4_after_EQ4 in FIG. 16, which is generally referenced by numeral 1602. However, the frequency response increases around 6 KHz, which is generally represented by numeral 1706, as compared to the frequency response of HEADPHONE4_after_EQ4 at 6 KHz as represented by numeral 1606, therefore the gains of the filter may be reduced.

FIG. 18 is a graph 1800 that illustrates frequency response data generated by three different in-ear headphone assemblies ("HEADPHONES5-7"), and a common subjective target function. The experiment described above with reference to FIG. 17, was repeated for the different in-ear headphone assemblies. From this data, a common target function, labeled "TARGET_in-ear", was determined based on an average of subjective EQ filters associated with headphones 5-7. TARGET_in-ear may be used as a target function for various in-ear headphone assemblies.

A method to determine the perceived frequency response of a headphone is described in U.S. application Ser. No. 13/415,536 to Horbach. The method includes receiving narrowband, pulse-like signals that are pair-wise presented to the subject, and adjusting the level of one of the pulses until both are equally loud. The method may be referred to as the "Equal Loudness Method". This process is repeated in several steps with increasing center frequency, until the whole audible range is covered. The test data can be used to design an EQ filter.

Figure 19:
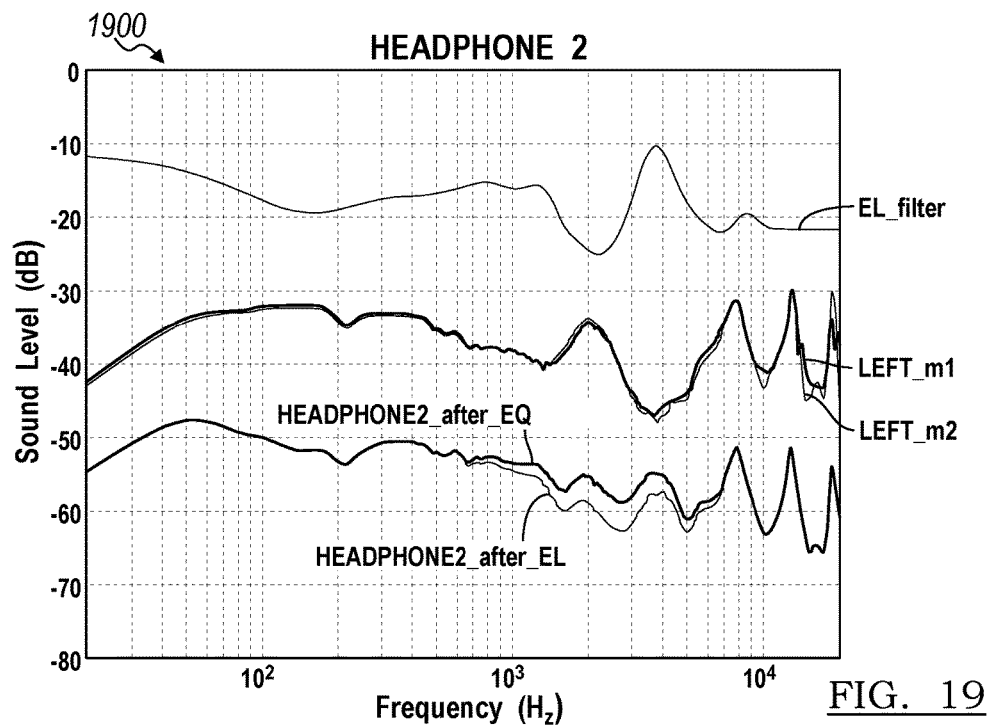
FIG. 19 is a graph illustrating a frequency response of sound measurement data generated by the second headphone assembly, and measured by the first test apparatus, and also illustrating a perceived frequency response determined by an equal loudness method.

FIG. 19 is a graph 1900 illustrating the frequency response of sound measurement data generated by the second headphone assembly and measured by the first test apparatus 402 and compared to a perceived frequency response as determined by the Equal Loudness Method. A first curve, labeled "EL_filter" illustrates the frequency response of an equalization filter that is generated using the Equal Loudness Method for the second headphone assembly. A second curve, labeled "LEFT_m1" illustrates data recorded by a first microphone 520 mounted to the left plate 514 (shown in FIGS. 4 and 5). A third curve, labeled "LEFT_m2" illustrates data recorded by a second microphone 521 mounted to the left plate 514. A fourth curve, labeled "HEADPHONE_after_EL" illustrates the headphone data equalized by the EL_filter. A fifth curve, labeled "HEADPHONE_EQ" illustrates the headphone data equalized by an equalization filter determined from the headphone measurement data. The experiment has been repeated for different headphone assemblies and test persons, and the test data indicates that the equal-loudness method generates filters that tend to equalize the responses as measured by the plate. This confirms the validity of the plate measurement to determine the perceived frequency response of a headphone.

Usually, standard ear simulators in accordance with IEC 60711 (for example GRAS 43AG) are used to characterize headphone frequency responses. These contain simulated pinna and human ear canal, such that the resulting response is claimed to resemble the sound pressure at the ear drum of an "average" person.

Figure 20:
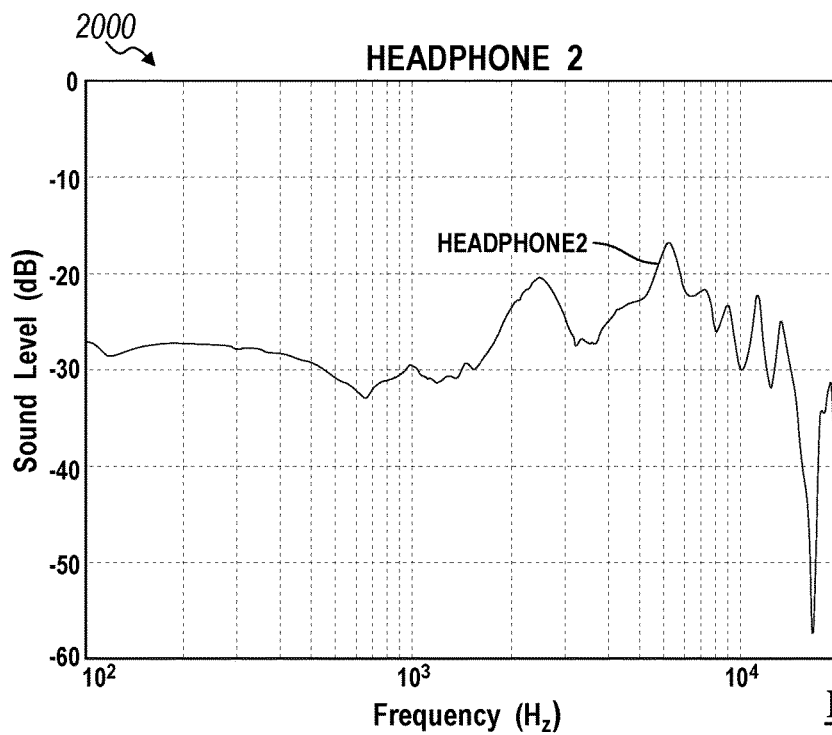
FIG. 20 is a graph illustrating a frequency response of sound measurement data generated by the second headphone assembly, and measured by a third test apparatus.
Figure 21:
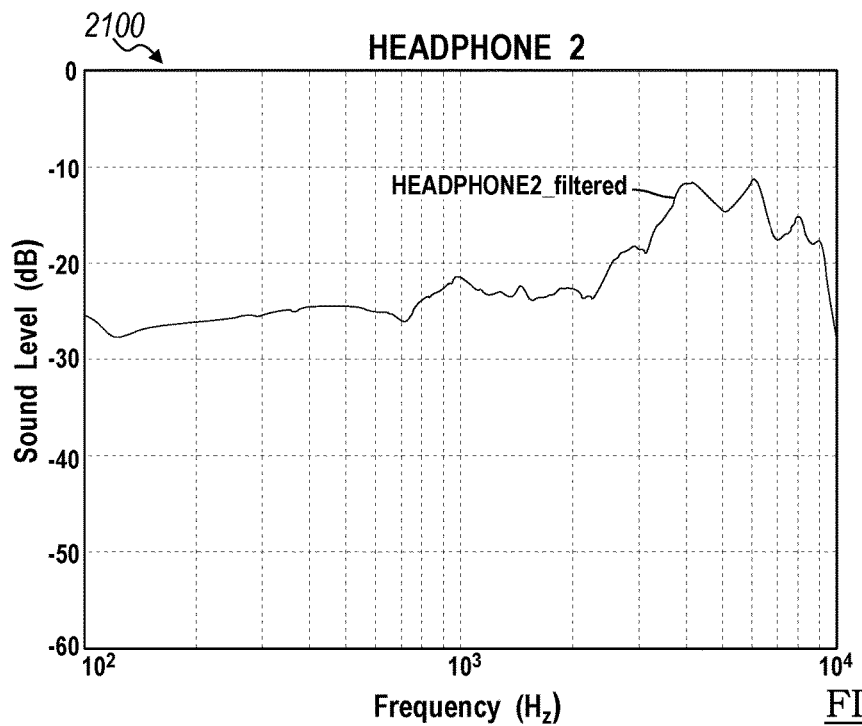
FIG. 21 is a graph illustrating a frequency response of the sound measurement data of FIG. 20 filtered by the equal loudness method.

FIGS. 20 and 21 illustrate the frequency response of sound measurement data generated by the second headphone assembly and measured by a conventional test apparatus including a commercially available coupler (not shown). FIG. 20 is a graph 2000 including a curve, labeled "headphone2", illustrating unfiltered frequency response data. FIG. 21 is a graph 2100 including a curve labeled "headphone2_filtered", illustrating the second headphone measurement data of FIG. 20, equalized by the equal-loudness filter. The headphone2_filtered curve illustrates that although some sound features have been equalized, the general shape of the curve is still dominated by the response of the coupler. In order to define a meaningful target function for an equalization filter, the frequency response of the coupler for an "ideal headphone" must be known in detail. However, practice shows that this response varies with the exact position of the headphone under test, is therefore subject to uncertainty and not clearly defined.

The fact that frequency responses measured using the first test apparatus 402 and the equal-loudness method closely match, leads to the following conclusion. The ear drum response is further processed by the brain until we are able to identify an external sound source to a high degree of accuracy. This means that body features, such as ear canal or pinna shape that vary dramatically among individuals, are compensated in the brain. We have learned to judge the quality of a loudspeaker's frequency response to a high degree of accuracy by comparing it to natural sounds. A headphone is not different. The brain tries to interpret its sound as an external source. Hence, its frequency response should be measured directly, without any simulated body parts.

Figure 22:
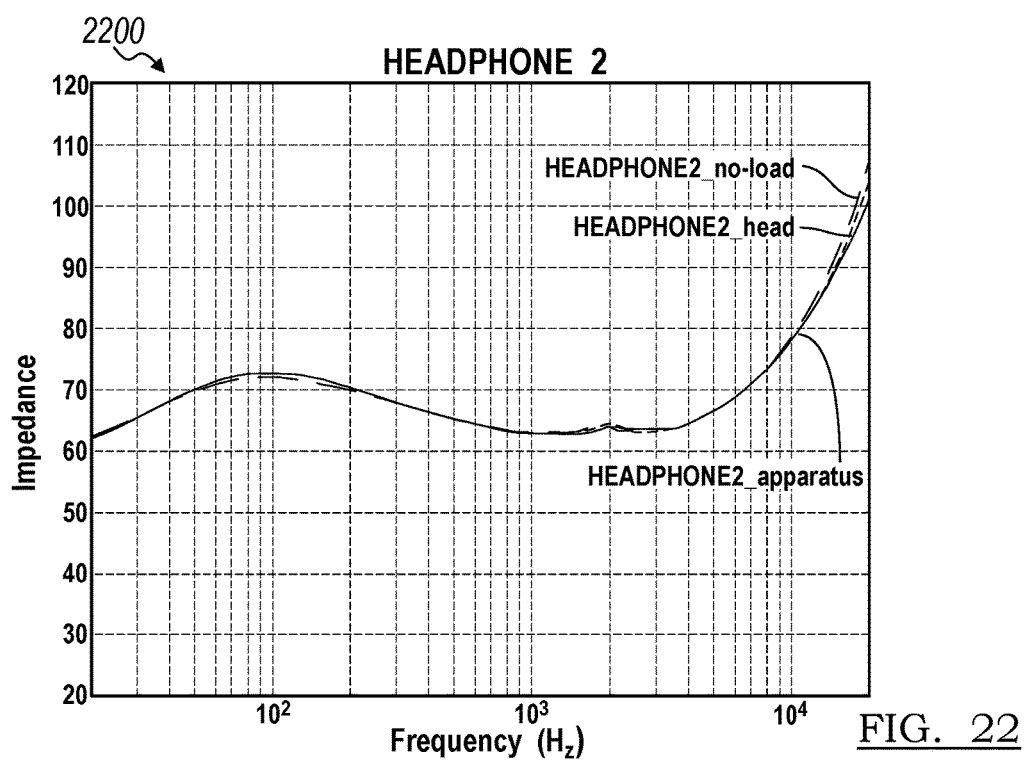
FIG. 22 is a graph illustrating an electrical impedance of the second headphone assembly under different loads.

FIG. 22 illustrates additional sound data measured by the first test apparatus 402. FIG. 22 is a graph 2200 including curves that illustrate the electrical impedance of Headphone 2 under different test conditions (e.g., no load ("HEADPHONE2_no-load"), on a human head ("HEADPHONE2_head"), and using the first test apparatus ("HEADPHONE2_apparatus")). There is minimal difference in the curves, which indicates that the impedance during the different test conditions remains the same, independent of load, which means there is no significant interaction with the acoustic load impedance. An accurate modeling of the acoustic load is therefore not necessary.

Also, experience with noise canceling headphones, where sound pressure in the area between ear and transducer membrane is captured by a microphone, showed that the sound pressure doesn't significantly depend on the type of coupler attached (plate or human head), as long as a good seal is guaranteed. The addition of a pinna acts as a damper. For example notches in the frequency response are less deep, but their general shape stays the same.

Figure 23:
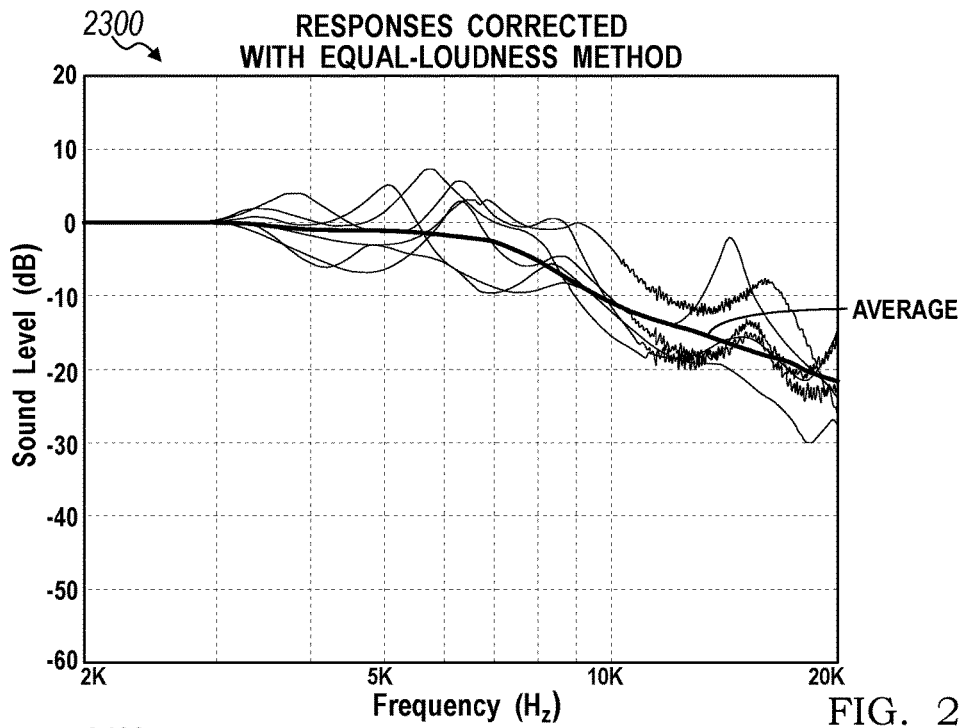
FIG. 23 is a graph illustrating an average of the differences between the responses of a set of five different in-ear headphone assemblies, between data generated by the equal-loudness method, and data generated by the second test apparatus.
Figure 24:
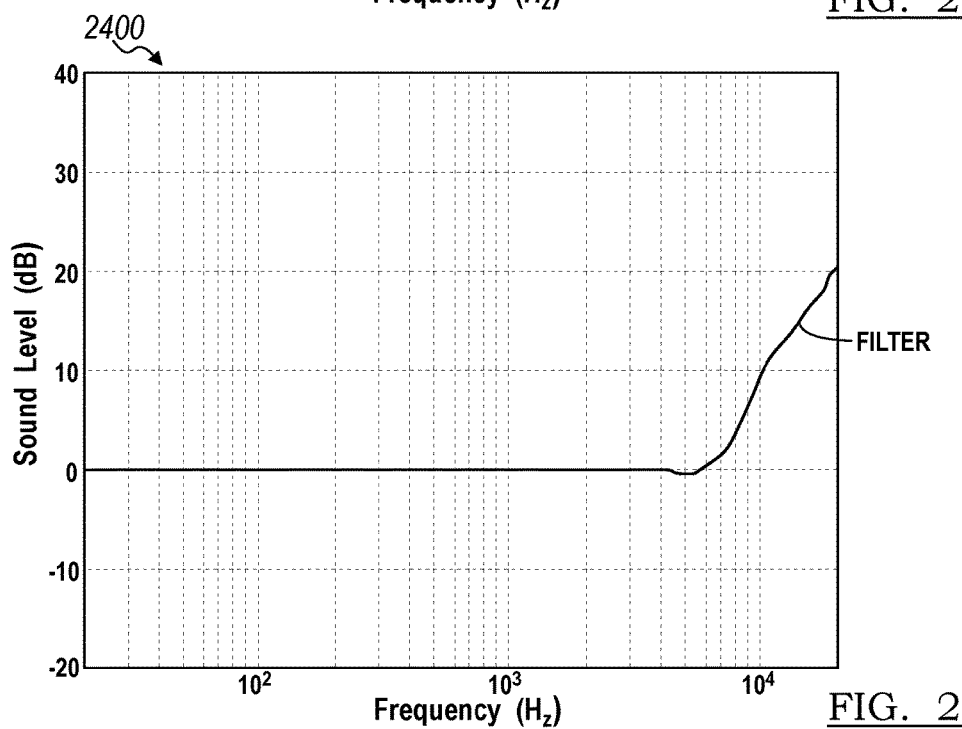
FIG. 24 is a graph of a correction filter based on the average of FIG. 23.

FIG. 23 illustrates a process for calibrating the coupler 604 of the second test apparatus 404. A plurality of in-ear headphone assemblies (not shown) were tested using the second test apparatus 404 and corrected using the equal loudness method. FIG. 23 is a graph 2300 including a plurality of curves that each illustrate the corrected response for each headphone assembly. An average of the responses was calculated and is illustrated by a curve, labeled "AVERAGE", which may be used to pre-equalize the coupler response above 5 kHz. The resulting correction filter is shown in the graph 2400 of FIG. 24, and labeled as "FILTER".

FIGS. 25-28 illustrate examples of compensated data generated by four different in-ear headphone assemblies that were each measured by the second test apparatus 404, and equalized by equalization filters generated using the equal-loudness method.

Figure 25:
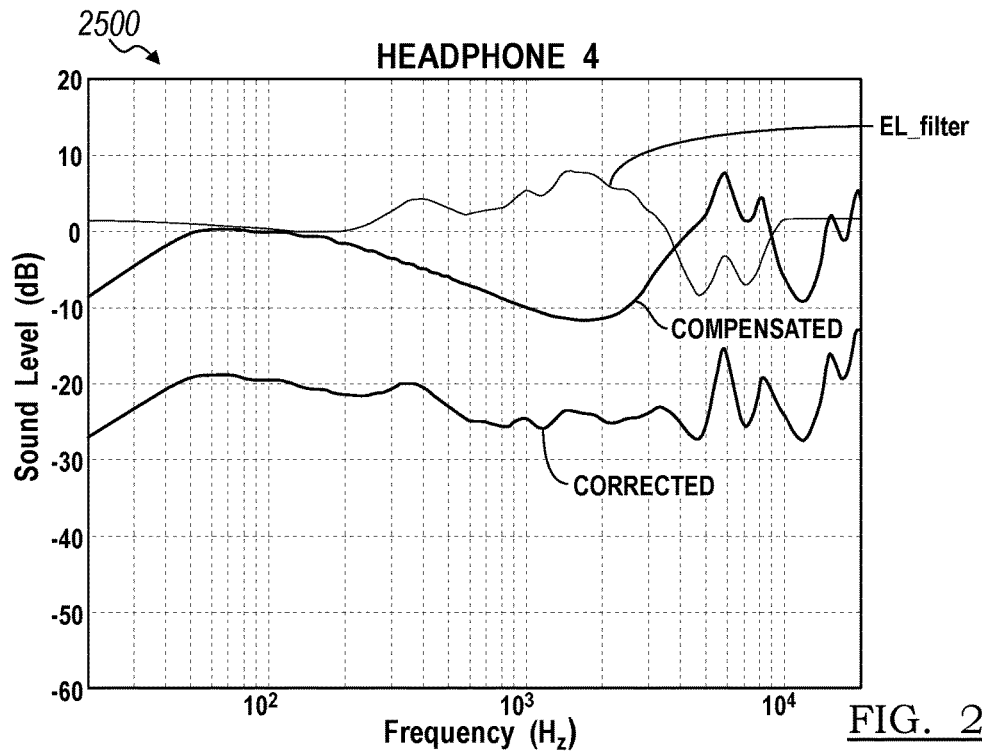
FIG. 25 is a graph illustrating a frequency response of compensated sound measurement data generated by the fourth headphone assembly, and measured by the second test apparatus, and also illustrating filtered data associated with the compensated measurement data and corrected by the equal loudness method.

FIG. 25 is a graph 2500 illustrating sound data generated by the fourth headphone assembly ("HEADPHONE 4") and measured by the second test apparatus 404. A first curve, labeled "COMPENSATED", illustrates the data measured by the second test apparatus 404, after it was calibrated as described above with reference to FIGS. 23 and 24. A second curve, labeled "EL_filter", illustrates the frequency response for the fourth headphone assembly as generated using the equal loudness method. A third curve, labeled "CORRECTED", illustrates data equalized by the sum of both COMPENSATED and EL_filter.

Figure 26:
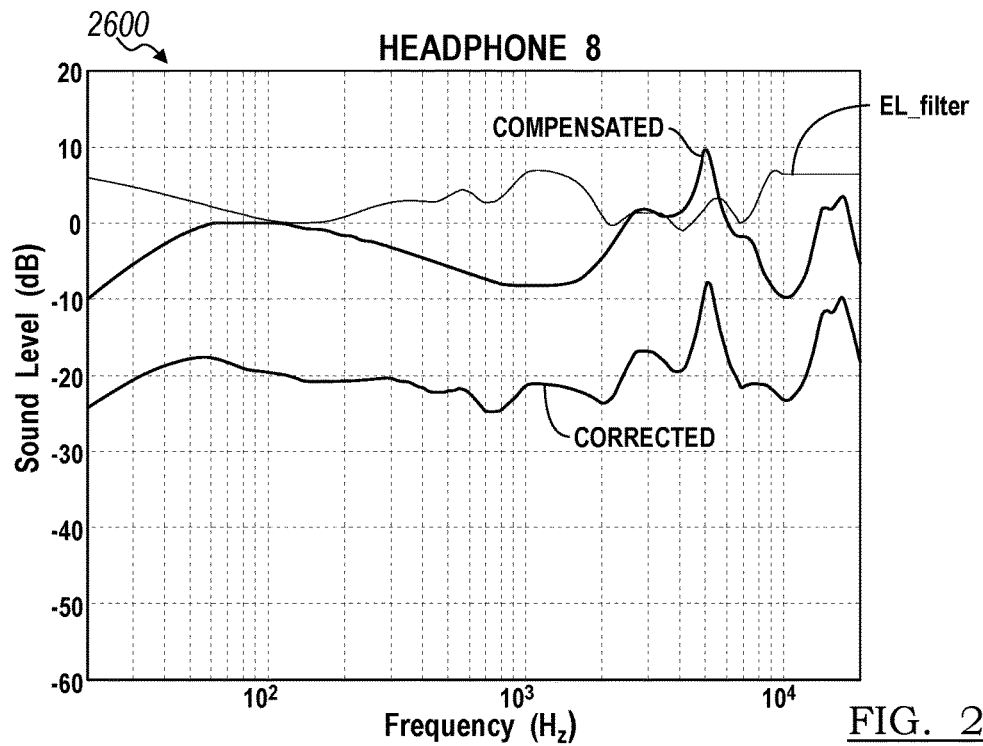
FIG. 26 is a graph illustrating a frequency response of compensated sound measurement data generated by an eighth headphone assembly, and measured by the second test apparatus, and also illustrating filtered data associated with the compensated measurement data and corrected by the equal loudness method.

FIG. 26 is a graph 2600 illustrating sound data generated by an eighth headphone assembly ("HEADPHONE 8") and measured by the second test apparatus 404. The eighth headphone assembly is an in-ear headphone assembly, according to one embodiment. A first curve, labeled "COMPENSATED", illustrates the data measured by the second test apparatus 404, after it was calibrated as described above with reference to FIGS. 23 and 24. A second curve, labeled "EL_filter", illustrates the frequency response for the eighth headphone assembly as generated using the equal loudness method. A third curve, labeled "CORRECTED", illustrates data equalized by the sum of both COMPENSATED and EL_filter.

Figure 27:
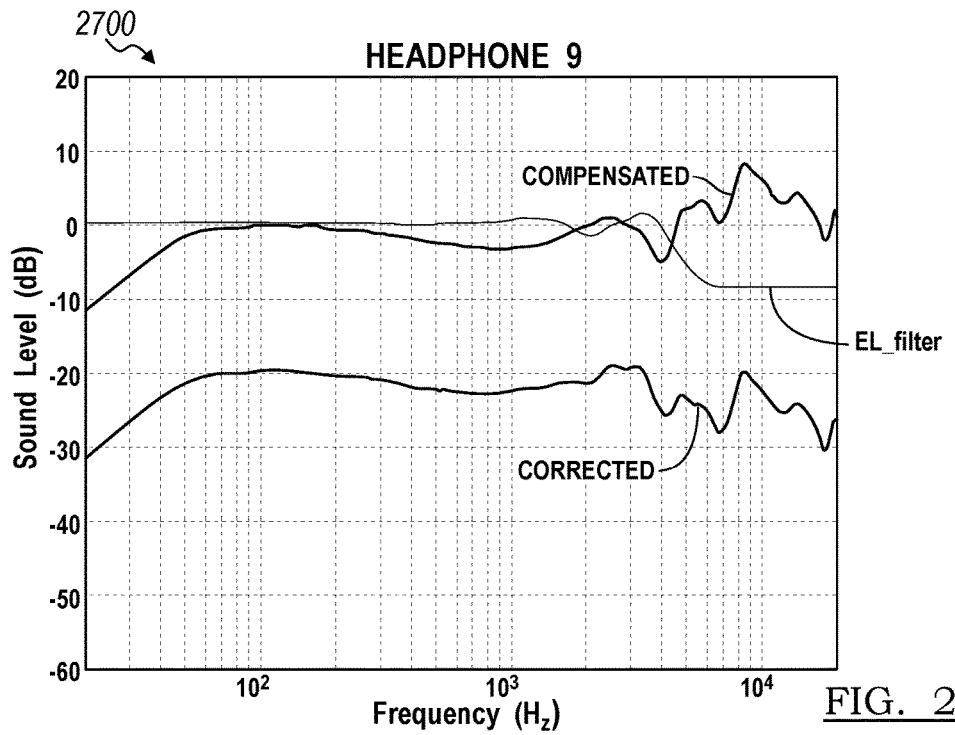
FIG. 27 is a graph illustrating a frequency response of compensated sound measurement data generated by a ninth headphone assembly, and measured by the second test apparatus, and also illustrating filtered data associated with the compensated measurement data and corrected by the equal loudness method.

FIG. 27 is a graph 2700 illustrating sound data generated by a ninth headphone assembly ("HEADPHONE 9") and measured by the second test apparatus 404. The ninth headphone assembly is an in-ear headphone assembly, according to one embodiment. A first curve, labeled "COMPENSATED", illustrates the data measured by the second test apparatus 404, after it was calibrated as described above with reference to FIGS. 23 and 24. A second curve, labeled "EL_filter", illustrates the frequency response for the ninth headphone assembly as generated using the equal loudness method. A third curve, labeled "CORRECTED", illustrates data equalized by the sum of both COMPENSATED and EL_filter.

Figure 28:
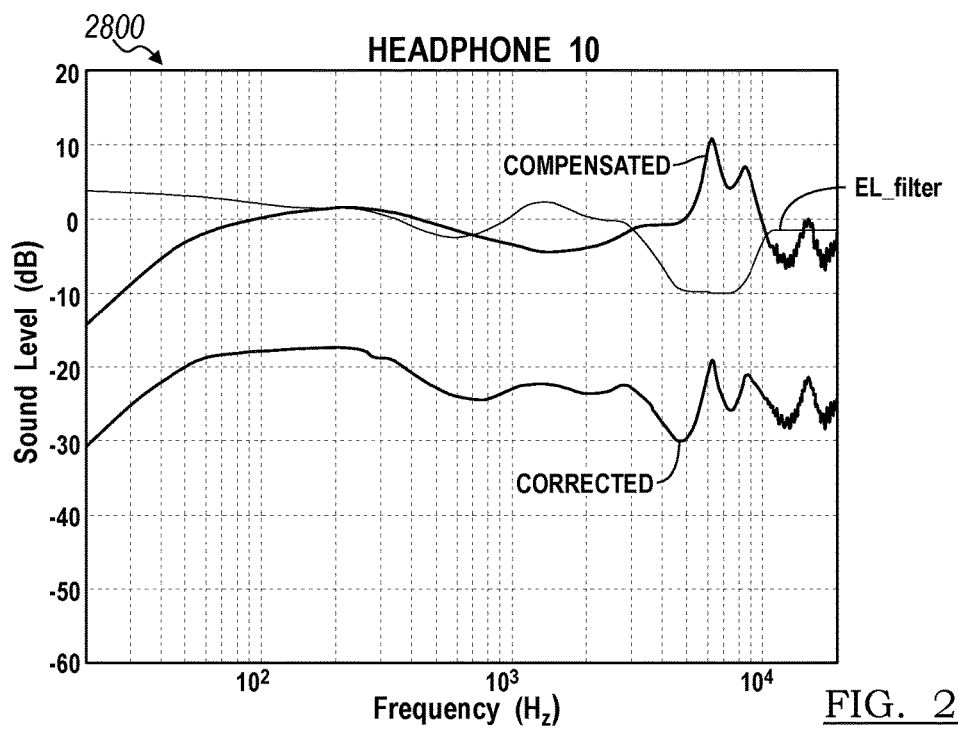
FIG. 28 is a graph illustrating a frequency response of compensated sound measurement data generated by a tenth headphone assembly, and measured by the second test apparatus, and also illustrating filtered data associated with the compensated measurement data and corrected by the equal loudness method.

FIG. 28 is a graph 2800 illustrating sound data generated by a tenth headphone assembly ("HEADPHONE 10") and measured by the second test apparatus 404. The tenth headphone assembly is an in-ear headphone assembly, according to one embodiment. A first curve, labeled "COMPENSATED", illustrates the data measured by the second test apparatus 404, after it was calibrated as described above with reference to FIGS. 23 and 24. A second curve, labeled "EL_filter", illustrates the frequency response for the tenth headphone assembly as generated using the equal loudness method. A third curve, labeled "CORRECTED", illustrates data equalized by the sum of both COMPENSATED and EL_filter. In all cases, the responses match to a high degree, and the results are flatter and smoother, which validates the new test method.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method to enhance reproduction of sound, the method comprising:
providing a loudspeaker assembly with at least one transducer within a listening room;
providing at least one microphone at a listening seat location within the listening room;
providing a test audio signal to at least one transducer;
measuring test audio output generated by the loudspeaker assembly using the at least one microphone;
determining a target function indicative of a target frequency response for a headphone assembly based on the measured test audio output;
providing a first audio signal to at least one headphone transducer of the headphone assembly;
measuring audio output generated by the at least one headphone transducer in response to receiving the first audio signal using a test apparatus with simplified contours;
receiving a second audio signal;
filtering the second audio signal using an equalization filter indicative of a difference between the measured audio output and the target function; and
providing the filtered audio signal to the at least one headphone transducer.

2. The method of claim 1 wherein measuring audio output generated by the at least one headphone transducer further comprises:
providing the test apparatus with simplified contours and at least one microphone supported by the test apparatus within a listening room;
mounting the headphone assembly to the test apparatus such that the at least one headphone transducer is located proximate to the at least one microphone;
providing the first audio signal to at least one headphone transducer of the headphone assembly; and
measuring the audio output generated by the at least one headphone transducer in response to receiving the first audio signal using the at least one microphone.

3. The method of claim 2 wherein the at least one microphone further comprises at least two microphones, the method further comprising:
measuring the audio output generated by the at least one headphone transducer in response to receiving the first audio signal using the at least two microphones;
calculating a spatial average of the measured audio output; and
determining the equalization filter for adjusting the spatial average of the measured audio output to correspond to the target function.

4. The method of claim 1 further comprising filtering the second audio signal using the equalization filter and a subjective filter.

5. The method of claim 1 further comprising:
receiving input indicative of a user selected audio parameter;
determining a second equalization filter for adjusting the audio based the input; and
filtering the second audio signal using the equalization filter and the second equalization filter.

6. A system comprising:
a test apparatus with simplified contours comprising:
a plate;
a coupler supported by the plate and formed in a cylindrical shape with a first end and a second end spaced apart from each other with an aperture projecting therebetween, wherein the second end is sized for receiving an in-ear headphone; and
at least one microphone supported by the plate and oriented within the aperture at the first end of the coupler;
a housing;

at least one audio transducer supported by the housing; and a processor in the housing programmed to:
receive an audio signal;
filter the audio signal using an equalization filter indicative of a difference between a target function and audio output measured using the test apparatus with simplified contours; and
provide the filtered audio signal to the at least one audio transducer.

7. The system of claim 6 further comprising the equalization filter, wherein the equalization filter further comprises a linear equalization filter.

8. The system of claim 7 wherein the linear equalization filter further comprises a finite impulse response (FIR) filter.

9. The system of claim 8 wherein the FIR filter further comprises a minimum phase FIR filter.

10. The system of claim 6 further comprising the equalization filter, wherein the equalization filter further comprises at least one of cascaded biquadratic equalization filters and a finite impulse response (FIR) filter.

11. The system of claim 6 further comprising the equalization filter, wherein the equalization filter further comprises at least one of a low frequency shelving filter and a high frequency cut filter.

12. A method to enhance reproduction of sound, the method comprising:
providing a headphone assembly including at least one headphone transducer;
providing a test apparatus with simplified contours and an array of microphones supported by the test apparatus within a listening room;
mounting the headphone assembly to the test apparatus such that the at least one headphone transducer is located proximate to the array of microphones;
providing an unfiltered audio signal to at least one headphone transducer of the headphone assembly;
measuring audio output generated by the at least one headphone transducer in response to receiving the unfiltered audio signal using the array of microphones;
calculating a spatial average of the measured audio output;
determining an equalization filter for adjusting the spatial average of the measured audio output to correspond to a target function;
receiving an audio signal; and
filtering the audio signal using the equalization filter.

13. The method of claim 12 further comprising determining the target function, wherein the target function is indicative of a target frequency response for the headphone assembly.

14. The method of claim 12 further comprising:
providing a loudspeaker assembly with at least one transducer within a listening room;
providing at least one microphone at a listening seat location within the listening room;
providing a test audio signal to at least one transducer;
measuring test audio output generated by the loudspeaker assembly in response to receiving the test audio signal using the at least one microphone; and
determining the target function based on the measured test audio output.

15. The method of claim 12 further comprising determining the equalization filter, wherein the equalization filter is adapted to adjust the measured audio output to correspond to the target function.

16. The method of claim 12 further comprising measuring audio output generated by the at least one headphone transducer using the test apparatus with simplified contours.

* * * * *